(12) United States Patent
Purushothaman (10) Patent No.: US 11,449,407 B2
(45) Date of Patent: Sep. 20, 2022

(54) SYSTEM AND METHOD FOR MONITORING COMPUTING PLATFORM PARAMETERS AND DYNAMICALLY GENERATING AND DEPLOYING MONITORING PACKAGES

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 320 days.

(21) Appl. No.: 16/885,442

(22) Filed: May 28, 2020

(65) Prior Publication Data

US 2021/0374029 A1 Dec. 2, 2021

(51) Int. Cl.
*G06F 11/30* (2006.01)
*G06F 11/34* (2006.01)

(52) U.S. Cl.
CPC ...... *G06F 11/3093* (2013.01); *G06F 11/3055* (2013.01); *G06F 11/3423* (2013.01)

(58) Field of Classification Search
CPC .. G06F 11/008; G06F 11/302; G06F 11/3055; G06F 11/3093; G06F 11/3409; G06F 11/3419; G06F 11/3423; G06F 2201/865; G06F 2201/875; G06F 11/30–3495
See application file for complete search history.

(56) References Cited

U.S. PATENT DOCUMENTS

| 4,414,633 A | 11/1983 | Churchill |
| 4,866,712 A | 9/1989 | Chao |
| 5,237,677 A | 8/1993 | Hirosawa et al. |
| 5,293,323 A | 3/1994 | Doskocil et al. |
| 5,321,833 A | 6/1994 | Chang et al. |
| 5,500,940 A | 3/1996 | Skeie |
| 5,596,712 A | 1/1997 | Tsuyama et al. |
| 5,933,822 A | 8/1999 | Braden-Harder et al. |
| 6,385,602 B1 | 5/2002 | Tso et al. |
| 7,020,697 B1 * | 3/2006 | Goodman .............. G06Q 10/10 714/1 |
| 7,079,010 B2 | 7/2006 | Champlin |
| 7,430,590 B1 | 9/2008 | Rive et al. |

(Continued)

*Primary Examiner* — Matthew J Brophy (57) ABSTRACT

A system for monitoring a computing platform configured to receive a particular metric from metrics associated with the computing platform. A plurality of layers of the computing platform are monitored. Monitoring parameters of the plurality of layers of the plurality of layers are determined. Heuristics of each monitoring parameter are determined over a time period. Monitoring packages are created from the monitoring parameters based on correlations between groups of monitoring parameters, the plurality of layers, and the metrics. Based on the particular metric, a string of monitoring packages is dynamically created from the monitoring packages. A behavior of the particular metric is determined in a configurable time duration in the future using the dynamically created string of monitoring packages. Possible failures of the computing platform related to the particular metric are predicted in an environment of the computing platform based on the determined behavior of the particular metric.

18 Claims, 3 Drawing Sheets

(56) References Cited

U.S. PATENT DOCUMENTS

| | | | |
|---|---|---|---|
| 7,467,198 B2* | 12/2008 | Goodman | G06Q 10/06 |
| | | | 709/227 |
| 7,496,898 B1 | 2/2009 | Vu | |
| 8,402,081 B2 | 3/2013 | Sandoval et al. | |
| 8,713,154 B2 | 4/2014 | Pietrek et al. | |
| 8,898,620 B2 | 11/2014 | Eizenman et al. | |
| 9,104,409 B2 | 8/2015 | Dodeja et al. | |
| 9,802,080 B2 | 10/2017 | Burich et al. | |
| 9,934,670 B2 | 4/2018 | Hyland et al. | |
| 10,756,990 B1* | 8/2020 | Chakkassery Vidyadharan | |
| | | | G06F 11/3442 |
| 11,003,525 B2* | 5/2021 | Efremov | G06F 11/0706 |
| 11,307,949 B2* | 4/2022 | Almasan | G06F 11/34 |
| 11,321,160 B2* | 5/2022 | Agarwal | G06F 11/0793 |
| 2001/0052087 A1 | 12/2001 | Garg et al. | |
| 2002/0002443 A1 | 1/2002 | Ames et al. | |
| 2002/0052947 A1 | 5/2002 | Duimovich et al. | |
| 2002/0107958 A1 | 8/2002 | Faraldo, II | |
| 2002/0129014 A1 | 9/2002 | Kim et al. | |
| 2004/0010716 A1 | 1/2004 | Childress et al. | |
| 2004/0030688 A1 | 2/2004 | Aridor et al. | |
| 2004/0220945 A1 | 11/2004 | Pioli et al. | |
| 2006/0059253 A1* | 3/2006 | Goodman | G06Q 10/10 |
| | | | 709/223 |
| 2006/0277248 A1 | 12/2006 | Baxter et al. | |
| 2007/0294369 A1 | 12/2007 | Ginter et al. | |
| 2008/0040709 A1 | 2/2008 | Blancha et al. | |
| 2010/0106678 A1 | 4/2010 | Pietrek et al. | |
| 2010/0287541 A1* | 11/2010 | Saunders | G06F 11/3466 |
| | | | 717/139 |
| 2011/0283265 A1* | 11/2011 | Gagliardi | G06F 11/3495 |
| | | | 717/130 |
| 2012/0016621 A1 | 1/2012 | Tan et al. | |
| 2017/0255455 A1* | 9/2017 | Collier | G06F 11/3438 |
| 2018/0276096 A1* | 9/2018 | Gao | G06F 11/3495 |
| 2018/0349168 A1* | 12/2018 | Ahmed | G06F 9/45558 |
| 2019/0149426 A1* | 5/2019 | Almasan | G06F 11/3409 |
| | | | 709/224 |
| 2020/0089533 A1* | 3/2020 | Guha | G06F 11/3006 |
| 2020/0092180 A1* | 3/2020 | Bajaj | H04L 67/535 |
| 2021/0072965 A1* | 3/2021 | Masters | G06F 9/44505 |
| 2021/0133015 A1* | 5/2021 | Agarwal | G06F 11/36 |
| 2021/0303632 A1* | 9/2021 | Parthasarathy | G06F 11/3006 |
| 2021/0334194 A1* | 10/2021 | Xiao | G06F 11/3692 |
| 2021/0357302 A1* | 11/2021 | Hoffnung | G06F 9/5011 |

* cited by examiner

SYSTEM AND METHOD FOR MONITORING COMPUTING PLATFORM PARAMETERS AND DYNAMICALLY GENERATING AND DEPLOYING MONITORING PACKAGES

TECHNICAL FIELD

The present disclosure relates generally to monitoring systems, and more specifically to a system and method for monitoring computing platform parameters and dynamically generating and deploying monitoring packages.

BACKGROUND

In existing monitoring systems, in order to monitor a computing platform, a large amount of data is generated from the computing platform. The generated data are generally used to monitor the computing platform such as a performance, and availability, etc. The generated data only signifies a behavior of the computing platform at the current time. The existing monitoring systems lack capabilities to effectively mine the generated data to extract meaningful insights from the platform over time.

SUMMARY

In one embodiment, a system includes a processor that is configured to receive a specific metric from the plurality of metrics of the computing platform, where the specific metric is selected by a user. The user selects the specific metric in order to monitor the computing platform. The processor monitors a plurality of layers of the computing platform and identifies monitoring parameters of each layer. The plurality of layers comprises a plurality of application specific layers and a plurality of infrastructure specific layers. The monitoring parameters comprise a plurality of application specific parameters associated with the application specific layers and a plurality of infrastructure specific parameters associated with the infrastructure specific layers. The processor then identifies correlations between the groups of monitoring parameters and the plurality of metrics such that a first group of monitoring parameters that are related to a first metric is correlated together and a second group of monitoring parameters that are related to a second metric are correlated together. The groups of monitoring parameters are identified based on the correlations between the monitoring parameters and the plurality of metrics. The processor then determines heuristics of the monitoring parameters over a period of time that is configurable based on each monitoring parameter and the plurality of metrics. Based at least upon the identified correlations between the groups of monitoring parameters, the plurality of layers, and the plurality of metrics, the processor creates a plurality of monitoring packages from the monitoring parameters.

The plurality of monitoring packages may include a first application specific monitoring package, a second application specific monitoring package, a first infrastructure specific monitoring package, and a second infrastructure specific monitoring package. The first application specific monitoring package includes a first plurality of application specific parameters measured over the time period, wherein the first plurality of application specific parameters is associated with the first metric. The second application specific monitoring package includes a second plurality of application specific parameters measured over the time period, wherein the second plurality of application specific parameters is associated with the second metric. The first infrastructure specific monitoring package includes a first plurality of infrastructure specific parameters measured over the time period, wherein the first plurality of infrastructure specific parameters is associated with the first metric. The second infrastructure specific monitoring package includes a second plurality of infrastructure specific parameters measured over the time period, wherein the second plurality of infrastructure specific parameters is associated with the second metric.

The processor then dynamically creates a string of monitoring packages from the plurality of monitoring packages based at least in part upon the specific metric selected by the user, the heuristics of the monitoring parameters, and the current environmental conditions of the computing platform. The dynamically created string of monitoring packages comprises at least one application specific monitoring package and at least one infrastructure specific monitoring package.

Throughout this process, the processor is able to identify a unique string or combination of monitoring packages to use in monitoring the computing platform in terms of the user-selected metric for a specific environmental condition. For example, if the heuristics of the monitoring parameters indicate that the computing platform is error-free with respect to the specific metric, the processor may dynamically create a first string of monitoring packages to monitor the computing platform. For example, if the heuristics of the monitoring parameters indicate that the computing platform is error-prone with respect to the specific metric, the processor may dynamically create a second string of monitoring packages to monitor the computing platform. For example, if the heuristics of the monitoring parameters indicate a stable computing platform with respect to the specific metric, the processor may dynamically create a third string or combination of monitoring packages to monitor the computing platform. For example, if the heuristics of the monitoring parameters indicate a volatile computing platform with respect to the specific metric, the processor may dynamically create a fourth string of monitoring packages to monitor the computing platform.

Based on the user-selected metric, the heuristics of the monitoring parameters, and the current environmental conditions of the computing platform, the dynamically generated string of monitoring packages may include a different combination of monitoring packages. In some examples, the generated string of monitoring packages comprises at least one application specific monitoring package and at least one infrastructure specific monitoring package. The processor then determines a behavior of the specific metric in a configurable time duration in the future using the dynamically created string of monitoring packages. Based on the determined behavior of the specific metric in the configurable time duration in the future, the processor predicts possible failures of the computing platform related to the specific metric in the current environment of the computing platform.

Existing monitoring systems lack capabilities to effectively mine the generated data to extract meaningful insights from monitoring parameters of the platform over time. The system disclosed in the present application provides a technical solution to this technical problem by dynamically generating and deploying strings of monitoring packages for each metric from a plurality of metrics of a computing platform for different environmental conditions. The disclosed system provides several practical applications and technical advantages which include identifying correlations between groups of monitoring parameters and the plurality of metrics of the computing platform over a period of time, generating a plurality of monitoring packages from the monitoring parameters based on the identified correlations, layers of the computing platform, and the plurality of metrics of the monitoring platform, dynamically generating strings of monitoring packages for monitoring the computing platform in terms of each metric that provide meaningful insights of a behavior of each metric over the period of time in different environmental conditions. The disclosed system also provides a process for determining behaviors of metrics of the computing platform and predicting possible failures of the computing platform related to each of the metrics in different environmental conditions of the computing platform over a time period in the future. The disclosed system improves the operation of the computing platform by enabling the system to learn the behaviors of the metrics of the computing platform in different environmental conditions over a period of time and predict possible failures of the computing platform related to the metrics in the computing platform's operation. The disclosed system then alerts a user regarding the possible failures so that the user takes measures to prevent the possible failures and improve the operation of the computing platform. In the disclosed system, a subset of monitoring parameters that are correlated to a specific metric based on their heuristics and their effect on the specific metric is selected to be used in monitoring the computing platform. Thus, the disclosed system improves the monitoring process and efficiency by reducing the number of monitoring parameters to the subset of monitoring parameters from monitoring parameters and provides meaningful insights about the specific metric for a given environmental condition of the computing platform.

The disclosed system also provides an accurate monitoring process by determining correlations among different groups of the monitoring parameters groups and using the identified correlations among the different groups to dynamically generate a string of monitoring packages to monitor the computing platform in terms of the specific metric from a plurality of metrics such as a performance, an availability, a recovery time, a resiliency, an error rate, an error type, a data traffic, a latency, etc. associated with the computing platform. In addition, the disclosed system provides the ability to accurately determine the behavior of the metrics and predict the possible failures of the computing platform over a time period in the future, thus, improving the operation of the computing platform and reducing a down-time of the computing platform. More specifically, once the dynamic string of monitoring packages is generated for the specific metric, the system monitors the computing platform in terms of the specific metric and alerts the user of the possible failures with respect to the specific metric. Thus, the disclosed system provides improving the performance, the availability, the recovery time, the resiliency, the error rate, the data traffic, the latency of the computing system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
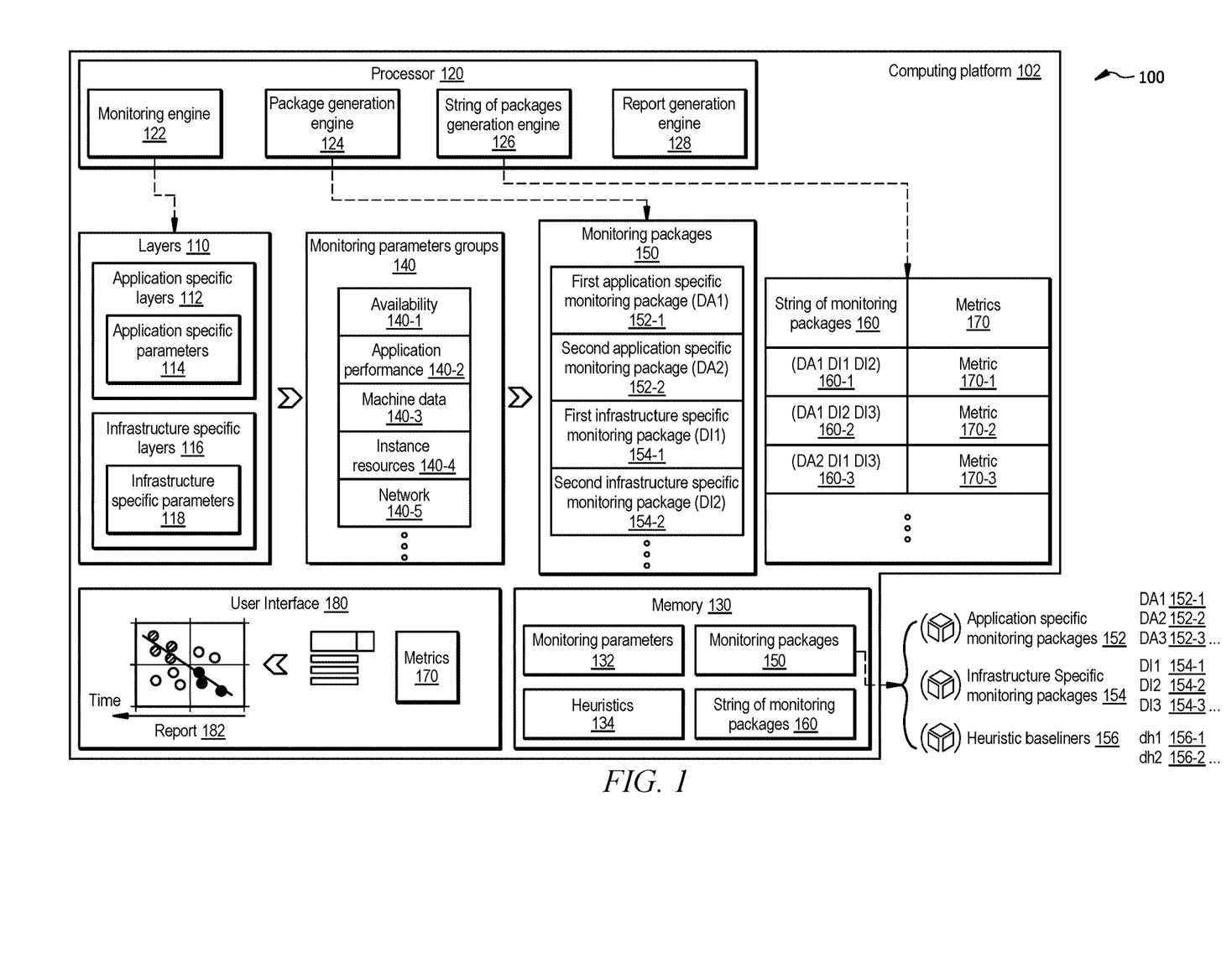
FIG. 1 illustrates one embodiment of a system for monitoring a computing platform.

FIG. 1 illustrates one embodiment of a system 100 configured to monitor a computing platform 102 with respect to the current environmental conditions of the computing platform 102. In one embodiment, the system 100 comprises the computing platform 102 that includes layers 110, a processor 120, a memory 130, and a user interface 180. In some embodiments, processor 120 comprises a monitoring engine 122, a package generation engine 124, a string of packages generation engine 126, and a report generation engine 128. The system 100 may be configured as shown or in any other suitable configuration.

In general, system 100 facilitates improved monitoring techniques to effectively extract meaningful information from monitoring parameters of a computing platform 102 in terms of a particular metric 170 of the computing platform 102. System 100 determines correlations between groups 140 of monitoring parameters of the computing platform 102, where each group 140 of monitoring parameters is correlated to each of the metrics 170 of the computing platform 102. System 100 generates monitoring packages 150 from the monitoring parameters based at least on the identified correlations between the groups 140 of monitoring parameters, layers 110 of the computing platform 102, and the metrics 170 of the computing platform 102. System 100 dynamically generates strings of monitoring packages 160, where each string of monitoring packages 160 comprises a plurality of monitoring packages 150 that when combined provides meaningful insights in monitoring the computing platform 102 in terms of a particular metric 170 for a given environmental condition of the computing platform 102. Therefore, system 100 improves the computing platform monitoring technology. System 100 also provides accurate predictions of possible failures of the computing platform 102 in terms of one or more particular metrics 170, which leads to a significant decrease in the down-time of the computing platform 102.

The processor 120 comprises one or more processors operably coupled to the memory 130. The processor 120 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 120 may be a programmable logic device, a microcontroller, a microprocessor, or any suitable combination of the preceding. The processor 120 is communicatively coupled to and in signal communication with the memory 130. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory 130 and executes them by directing the coordinated operations of the ALU, registers and other components. The one or more processors are configured to implement various instructions. For example, the one or more processors are configured to execute instructions to implement monitoring the computing platform 102 and dynamically generating and deploying monitoring packages. In this way, processor 120 may be a special purpose computer designed to implement the functions disclosed herein. In an embodiment, the system 100 and a method 300 to implement the system 100 are implemented using logic units, FPGAs, ASICs, DSPs, or any other suitable hardware. The system 100 is configured to operate as described in FIGS. 1 and 2. For example, the system 100 may be configured to perform the steps of method 300 as described in FIG. 3.

Memory 130 may comprise any device operable to store, either permanently or temporarily, data, operational software, or other information for a processor. In some embodiments, the memory 130 comprises one or more disks, tape drives, or solid-state drives, and may be used as an over-flow data storage device, to store programs when such programs are selected for execution, and to store instructions and data that are read during program execution. The memory 130 may comprise any one or a combination of volatile or non-volatile local or remote devices suitable for storing information. For example, the memory 130 may comprise read-only memory (ROM), random-access memory (RAM), ternary content-addressable memory (TCAM), dynamic random-access memory (DRAM), and static random-access memory (SRAM), magnetic storage devices, optical storage devices, semiconductor storage devices, or any other suitable information storage device or a combination of these devices. Memory 130 is operable to store monitoring parameters 132, heuristics 134, monitoring packages 150, string of monitoring packages 160, and/or any other suitable data or instructions. The monitoring packages 150 are stored to be reused for different metrics to be selected in the future. The monitoring parameters 132 comprise application specific parameters 114 and infrastructure specific parameters 118. The monitoring packages 150 comprise the monitoring packages generated by the package generation engine 124. The string of monitoring packages 160 comprise strings of monitoring packages for different metrics 170 in different environmental conditions of computing platform 102 generated by the string of packages generation engine 126.

Computing platform 102 generally may be any software and hardware infrastructure that is configured to perform specific functions and interact with users. Computing platform 102 may be implemented on any computing device, such as desktop computers, mobile phones, tablet computers, laptop computers, servers, etc. to maintain and monitor one or more functions of them. In some examples, the computing platform 102 may be a software platform or a software application that is configured to monitor and maintain providing financial services to clients and revenue streams. In another example, the computing platform 102 may be an operating system of a server that is configured to monitor and maintain functions of the server.

The computing platform 102 includes layers 110 that are generally infrastructural layers of the computing platform 102. The layers 110 include application specific layers 112 and infrastructure specific layers 116. The application specific layers 112 comprises a plurality of application specific parameters 114 that is used to monitor the status and function of each application specific layer 112. In some examples, the application specific layers 112 may include an application layer, a middleware layer, etc. Each of the application specific layers 112 is dedicated to performing one or more particular tasks or functions such as providing end-user access to a verity of shared network services, error-handling, recovery, etc.

The infrastructure specific layers 116 comprise a plurality of infrastructure specific parameters 118 that are used to monitor the status and function of each infrastructure specific layer 116. In some examples, the infrastructure specific layers 116 may include a database layer, operating system layer, virtual machine layer, server layer, storage layer, etc. Each of the infrastructure specific layers 116 is dedicated to performing one or more particular tasks or functions such as managing data storage, virtual computing, organizing communication protocols with servers and users, etc. The application specific parameters 114 and the infrastructure specific parameters 118 are stored in monitoring parameters 132 in memory 130.

Monitoring Engine

Monitoring engine 122 may be provided with or include software executed by processor 120 and configured to monitor the application specific layers 112 and the infrastructure specific layers 116. For example, the monitoring engine 122 may monitor the application specific layers 112 and the infrastructure specific layers 116 by executing a software code or a script with an instructional code to identify the application specific layers 112 and the infrastructure specific layers 116 and their functions. The monitoring engine 122 is also configured to determine and monitor the application specific parameters 114 and infrastructure specific parameters 118 in order to generate records of their functions. For example, each application specific parameters 114 and infrastructure specific parameters 118 may have a handle (i.e., a parameter name) and the monitoring engine 122 may execute a software or a script with an instructional code to save the functions and status of each application specific parameters 114 and infrastructure specific parameters 118 in memory 130.

In one embodiment, the monitoring engine 122 monitors the application specific parameters 114 and infrastructure specific parameters 118 in terms of their availability, performance, and heuristics 134. In some examples, the monitoring engine 122 may monitor the application specific parameters 114 and infrastructure specific parameters 118 to determine whether one or more of them are available to carry out functions to support the operation of the computing platform 102. In some examples, the monitoring engine 122 may monitor the application specific parameters 114 and infrastructure specific parameters 118 to determine the performance rates of each of them to support the operation of the computing platform 102. In some examples, the monitoring engine 122 may monitor the application specific parameters 114 and infrastructure specific parameters 118 to determine heuristics 134 or historical behavior of each of them. The monitoring engine 122 determines the heuristics 134 of the application specific parameters 114 and infrastructure specific parameters 118 by accessing their saved behaviors (which were previously recorded by the monitoring engine 122) stored in monitoring parameters 132. The monitoring engine 122 may determine the heuristics 134 of the application specific parameters 114 and infrastructure specific parameters 118 over a period of time that is configurable based on each monitoring parameter and metrics 170 of computing platform 102. The metrics 170 are evaluating factors associated with the computing platform 102, such as a performance, an availability, a recovery time, a latency, a resiliency, an error rate, a data traffic, etc. Some examples of the heuristics 134 of the application specific parameters 114 and infrastructure specific parameters 118 are described in more detail below in conjunction with the operational flow.

Package Generation Engine

Package generation engine 124 may be provided with or include software executed by processor 120 and configured to generate a plurality of monitoring packages 150 from the monitoring parameters 114 and 118 based at least upon the correlations between the monitoring parameters groups 140, the layers 110, and metrics 170. In this process, the package generation engine 124 first identifies monitoring parameters groups 140, where each monitoring parameters group 140 is correlated to a specific metric from metrics 170. Each monitoring parameters group 140 may comprise a set of application specific parameters among application specific parameters 114, a set of infrastructure specific parameters among infrastructure specific parameters 118, or a combination of both. Examples of monitoring parameter groups 140 are described in conjunction with the operational flow illustrated in FIG. 2.

The package generation engine 124 is further configured to identify correlations among different groups of monitoring parameters groups 140. This process helps to identify which groups among monitoring parameters groups 140 are related to each other in order to select appropriate groups among monitoring parameters groups 140 to monitor the computing platform 102 in terms of a specific metric 170. The package generation engine 124 then generates the monitoring packages 150 by bundling or concatenating different sets of monitoring parameters from the monitoring parameters 114 and 118 and their heuristics 134 (in the determined time period by the user) that are correlated with different metrics 170 as determined by the monitoring parameters groups 140. Some examples of the monitoring parameters groups 140 and monitoring packages 150 are described in conjunction with the operational flow illustrated in FIG. 2.

The package generation engine 124 is further configured to determine heuristics baseliners 156 of the monitoring parameters 114 and 118 with respect to different metrics 170. The heuristics baseliners 156 comprise the heuristics 134 of different sets of monitoring parameters among the monitoring parameters 114 and 118 that are related to different metrics 170 measured under normal environmental conditions of the computing platform 102 with respect to the corresponding different metrics 170. For example, the package generation engine 124 may access the heuristics 134 of a first set of monitoring parameters among the monitoring parameters 114 and 118 related to the first metric 170-1 measured when the computing platform 102 was operating under normal environmental conditions with respect to the first metric 170-1 and store them as a first heuristics baseliner ("dh1") 156-1 in memory 130. In another example, package generation engine 124 may access the heuristics of a second set of monitoring parameters among the monitoring parameters 114 and 118 related to the second metric 170-2 measured when the computing platform 102 was operating under normal environmental conditions with respect to the second metric 170-2 and store them as a second heuristics baseliner ("dh2") 156-2 in memory 130.

The package generation engine 124 uses the heuristics baseliners 156 to evaluate the current environmental condition of the computing platform 102 in terms of a specific metric from metrics 170. In this process, the package generation engine 124 determines the heuristics 134 of the monitoring parameters 114 and 118 and compares them with the heuristics baseliners 156 to determine whether the computing platform 102 is operating in normal environmental conditions in terms of different metrics 170. If the heuristics 134 of the monitoring parameters 114 and 118 are significantly different compared to the heuristics baseliners 156, it is determined that the computing platform 102 is not operating in normal environmental conditions with respect to the specific metric 170. On the other hand, if the heuristics 134 of the monitoring parameters 114 and 118 are similar to the heuristics baseliners 156, it is determined that the computing platform 102 is operating in normal environmental conditions with respect to the specific metric 170.

Report Generation Engine

Report generation engine 128 may be provided with or include software that is executed by processor 120 and is configured to generate a report 182 related to the specific metric 170 and determine a behavior of the specific metric 170 in the configurable time duration in the future using the dynamically created string of monitoring packages 160. Here, the report generation engine 128 learns a trend in changes of the specific metric 170 based on the heuristics 134 of the selected monitoring parameters from monitoring parameters 114 and 118 correlated to the specific metric 170 in the dynamically created string of monitoring package 160 and the current environmental condition of the computing platform 102, and then generates the report 182. The configurable time duration to determine the behavior of the specific metric 170 is set by the user, for example by selecting a desired time duration to generate the report 182 on the user interface 180. Additional information about the operation of the report generation engine 128 is described in conjunction with the operational flow.

User Interface

User interface 180 is generally operable to interact with a user. The user interface 180 may include a graphical user interface (GUI) that comprises a plurality of displays having interactive fields, drop-down menus, pulldown lists, and buttons operated by the user. The user interface 180 may include a plurality of groupings and boundaries for inputs and outputs. The user interface 180 may also include one or more fields for displaying reports and plots related to the specific metric. The user interface 180 is configured to display the plurality of metrics 170 for the user to choose from, for example in a drop-down menu. The user interface 180 is further configured to display the report 182 generated by the report generation engine 128 for the specific metric 170 selected by the user. The report 182 comprises the determined behavior and possible failures of the computing platform 102 in terms of the specific metric 170 in a configurable time duration in the future set by the user. In one example, the determined behavior and possible failures of the computing platform 102 in terms of the specific metric 170 may be displayed in a time-domain plot, where the X-axis is time and the Y-axis is the determined behavior with possible failures of the computing platform 102 in terms of the specific metric 170. In another example, the determined behavior and possible failures of the specific metric 170 may be displayed in terms of a percentage in the following hours, days, weeks, etc.

In general, system 100 facilitates generating a unique string or combination of monitoring packages 160 to monitor the computing platform 102 in terms of the specific metric 170, based on the specific metric 170, the current environmental condition of the computing platform 102, and heuristics 134 of the monitoring parameters (i.e., the application specific parameters 114 and infrastructure specific parameters 118) of the layers 110. The system 100 may also determine a behavior of the specific metric 170 in a configurable time duration in the future in order to predict possible failures of the computing platform 102 related to the specific metric 170. The system 100 may then alert the user to prevent the possible failures of the computing platform 102.

In operation, the computing platform 102 receives the specific metric 170 associated with the computing platform 102 from the user, such as through the user interface 180. Then, the monitoring engine 122 monitors layers 110 of the computing platform 102. The layers 110 include application specific layers 112 and infrastructure specific layers 116. The monitoring engine 122 then determines application specific parameters 114 associated with the application specific layers 112 and infrastructure specific parameters 118 associated with the infrastructure specific layers 116. The monitoring engine 122 determines the heuristics 134 of the application specific parameters 114 and infrastructure specific parameters 118 over a period of time that is configurable based on each monitoring parameter and metrics 170 of computing platform 102. Package generation engine 124 generates a plurality of monitoring packages 150 from the application specific parameters 114 and infrastructure specific parameters 118 based at least on correlations between monitoring parameters groups 140, the layers 110, and metrics 170. String of packages generation engine 126 dynamically generates a string of monitoring packages 160 based at least on the heuristics 134 of the monitoring parameters 114 and 118 and the specific metric 170 selected by the user. The report generation engine 128 then determines the behavior of the specific metric 170 in a configurable time in the future set by the user in order to predict possible failures of the computing platform 102 related to the specific metric 170.

Figure 2:
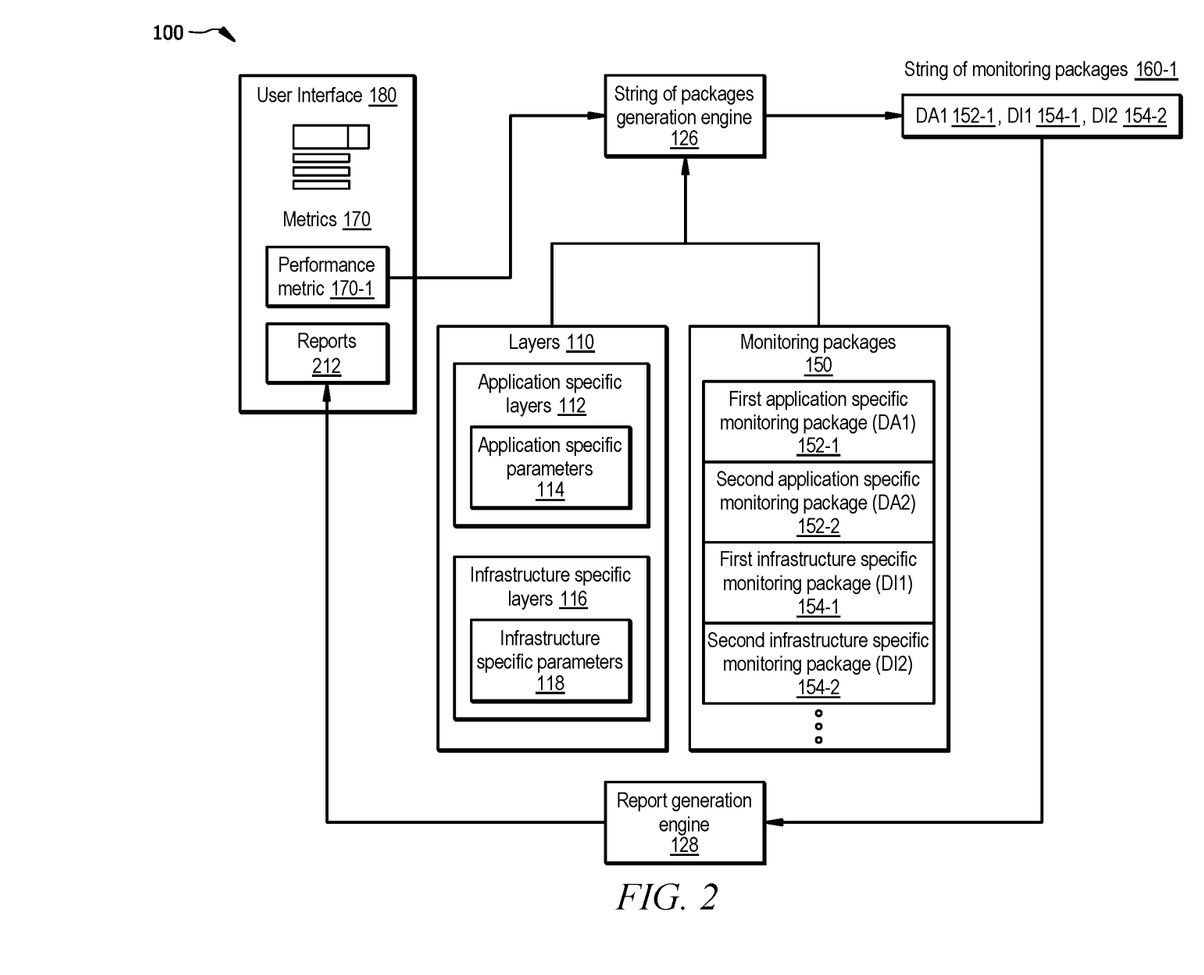
FIG. 2 illustrates one embodiment of an operational flow of the system depicted in FIG. 1 in conjunction with a particular metric.

First, the computing platform 102 receives a specific metric 170 from the user, such as through user interface 180. For example, the user may select the specific metric 170 from a drop-down menu in the user interface 180. An example of the operational flow of the system 100 is illustrated in FIG. 2, where the user selects a metric 170 from the drop-down menu of the user interface 180. Then, the monitoring engine 122 monitors the layers 110 of the computing platform 102 in order to determine the monitoring parameters (i.e., the application specific parameters 114 and infrastructure specific parameters 118) of layers 110. In some examples, the application specific parameters 114 may be related to a first processor, such as its speed, utilization, number of cores, temperature, bandwidth, cache size, bus size, socket type, etc. In some examples, the application specific parameters 114 may be related to a first memory, such as its storage size, available capacity, total capacity, speed, access type (e.g., slow access, fast access, etc.), model type (e.g., volatile, non-volatile, read-only, random-access, etc.), etc. In some examples, the application specific parameters 114 may be related to address spaces of the first memory, such as their ranges, sizes, etc. In some examples, the application specific parameters 114 may be related to page faults of the first memory, such as their frequency of occurrence, their outcome (whether a page fault has caused the first memory to crash), etc. In some examples, the application specific parameters 114 may be related to transaction failures of the first memory, such as their frequency of occurrence, their outcome (whether a transaction has caused the first memory to crash), etc. In some examples, the application specific parameters 114 may be related to error codes of the first memory and/or the first processor, such as their frequency of occurrence, their outcome (whether a page fault has caused the first memory to crash), etc. These examples of the application specific parameters 114 are illustrative and not restrictive. One skilled in the art would recognize that the application specific parameters 114 may include other examples within the scope of this disclosure. In some examples, the infrastructure specific parameters 118 may be related to a second processor, such as its speed, utilization, number of cores, temperature, bandwidth, cache size, bus size, socket type, etc. In some examples, the infrastructure specific parameters 118 may be related to a second memory, such as its storage size, available capacity, total capacity, speed, access type (e.g., slow access, fast access, etc.), model type (e.g., volatile, non-volatile, read-only, random-access, etc.), etc. In some examples, the infrastructure specific parameters 118 may be related to page files of the second memory, such as their frequency of occurrence, their outcome (whether a page fault has caused the second memory to crash), etc. In some examples, the infrastructure specific parameters 118 may be related to dynamic-link library (DLL) files, such as their function, errors caused by them, frequency of errors caused by them, the outcome of their errors (whether a DLL file error has caused the first processor and/or the first memory to crash), etc. In some examples, the infrastructure specific parameters 118 may be related to windows management instrumentation (WMI), such as its functions, errors, frequency of errors, error outcome (whether the WMI has caused the first processor and/or the first memory to crash), etc. These examples of the infrastructure specific parameters 118 are illustrative and not restrictive. One skilled in the art would recognize that the infrastructure specific parameters 118 may include other examples within the scope of this disclosure.

In one embodiment, the monitoring engine 122 continuously or periodically (e.g., every minute, every few minutes, or any suitable time duration) monitors the layers 110 to keep records of the monitoring parameters 114 and 118 even when the user has not selected a particular metric 170. Then, the monitoring engine 122 determines the heuristics of the monitoring parameters 114 and 118 from their previously recorded behaviors stored in memory 130 to identify a trend or a progression of the monitoring parameters 114 and 118 based on their previously recorded behaviors. In some examples, the monitoring engine 122 may determine the heuristics 134 of the monitoring parameters 114 and 118 by applying one or more mathematical functions, such as a time series function, a derivative function, and/or the like, on the monitoring parameters 114 and 118. The user may also select a period of time from some point in the past until present to determine the time duration of heuristics 134 of the monitoring parameters 114 and 118. Referring to the example illustrated in FIG. 2, where the user selects the performance metric 170-1 from the user interface 180 to monitor the computing platform 102, the user may also specify that to use the heuristics 134 of the monitoring parameters 114 and 118 from 30 days ago until the present time. In this case, the heuristics 134 of the monitoring parameters 114 and 118 for a 30-day period is selected, for example because the computing platform 102 has not shown much change in its performance metric 170-1 in the last 30 days. In another case where the user selects an availability metric 170 from the user interface 180 to monitor the computing platform 102 in terms of its availability, the user may also specify that the monitoring engine 122 accesses the heuristics 134 of the monitoring parameters 114 and 118 from 5 days ago until present time. In this case, the heuristics 134 of the monitoring parameters 114 and 118 for a 5-day period is selected, for example because the computing platform 102 has shown significant or some changes in its availability metric in the last 5 days.

Referring back to FIG. 1, the heuristics 134 of the application specific parameters 114 and infrastructure specific parameters 118 may indicate different aspects of historical behaviors of the monitoring parameters 114 and 118, respectively. In some embodiments, the heuristics 134 of each monitoring parameter among monitoring parameters 114 and 118 may include or be a time series that provides information about errors of the computing platform 102 in a configurable time period. For example, the heuristics 134 of the monitoring parameters 114 and 118 may be related to errors such as error rates, failure rates, and/or the like of the computing platform 102 in terms of a specific metric 170. In other embodiments, the heuristics 134 of each monitoring parameter may include or be a time series that provides information about the stability and volatility of the computing platform 102 in the configurable time period. For example, the heuristics 134 of the monitoring parameters 114 and 118 may be related to the amount of changes, frequency of changes, and/or the like in a specific metric 170 of the computing platform 102.

Generating Monitoring Packages

Once the application specific parameters 114, infrastructure specific parameters 118, and their heuristics 134 in the configured time duration are determined by the monitoring engine 122, the package generation engine 124 proceeds to generate the monitoring packages 150. First, the package generation engine 124 identifies correlations between groups of monitoring parameters 114 and 118 and metrics 170 in order to determine the monitoring parameter groups 140. Here, the package generation engine 124 identifies groups of monitoring parameters among monitoring parameters 114 and 118 that are correlated to each of metrics 170, for example based on their behavioral changes and how their behavioral changes affect the operation of the computing platform 102. For example, consider a group of monitoring parameters 114 and 118 that are related to the availability of one or more processors and/or memories within the computing platform 102 to perform a particular function. In this example, if the one or more processors and/or memories are not available to perform this particular function, for example, because they are occupied performing other functions, the computing platform 102 is not available to perform the particular function as scheduled. Thus, this particular group of monitoring parameters 114 and 118 is correlated with the availability metric 170 of the computing platform 102. Some examples of monitoring parameter groups 140 are shown in FIG. 1. Each monitoring parameters group 140 may comprise a set of application specific parameters 114, a set of infrastructure specific parameters 118, or a combination of both. For example, an availability group 140-1 may comprise a first plurality of application specific parameters 114 that are related to the first metric 170-1. In another example, an application performance group 140-2 comprises a first plurality of infrastructure specific parameters 118 that are related to the first metric 170-1. In another example, a machine data group 140-3 may comprise a first combination of application specific parameters 114 and infrastructure specific parameters 118 that generate data from operations of application specific layers 112 and infrastructure specific layers 116 that are related to the first metric 170-1 and the second metric 170-2. The generated data may include process logs and records from different application specific layers 112 and infrastructure specific layers 116. In another example, an instance resources group 140-4 may comprise a second combination of application specific parameters 114 and infrastructure specific parameters 118 that are related to computing instances in cloud computing functions and procedures with respect to the computing platform 102 that are related to a third metric 170-3. In another example, a network group 140-5 may comprise a third combination of application specific parameters 114 and infrastructure specific parameters 118 that are related to networking functions and procedures of the computing platform 102 that are related to the second metric 170-2 and the third metric 170-3.

As discussed above, the package generation engine 124 may also determine correlations among different monitoring parameters groups 140. For example, consider one or more of monitoring parameters from the first monitoring parameters group availability 140-1 that are related to the availability of a processor and/or a memory within the computing platform 102, where the availability of the processor indicates how occupied the processor is to perform functions as scheduled and the availability of the memory indicates how full or empty its buffer queues are to accept new coming instructions to transfer to the processor. Also consider one or more of monitoring parameters from the second monitoring parameters group application performance 140-2 that are related to the performance of the processors and/or the memory within the computing platform 102, where the performance of the processor indicates the amount of work the processor is able to complete in a given time period, e.g., one minute, and the performance of the memory indicates the amount of data the memory transferred to the processor. In this example, if the processor is routinely occupied with previous functions and cannot perform new functions as soon as the instructions are transferred by the memory and/or if the buffer queues of the memory are routinely full and the memory cannot accept new instructions to transfer to the processor, the performances of the processor and/or memory decreases as a result of the processor and/or memory not being available. Thus, the package generation engine 124 determines that the one or more of monitoring parameters from the first monitoring parameters group availability 140-1 are correlated with one or more of monitoring parameters from the second monitoring parameters group application performance 140-2. In this example, the correlation between first monitoring parameters group availability 140-1 and second monitoring parameters group application performance 140-2 is causal in that when the processor and/or memory are not available (e.g., when they are occupied with processing previous data and/or instructions), their performance decreases, i.e., they are not performing as expected. In other words, the lack of availability of the processor and/or memory causes a performance decrease.

In some examples, package generation engine 124 may determine that one or more of monitoring parameters from the first monitoring parameters group availability 140-1 may be correlated to one or more of the monitoring parameters from the second monitoring parameters group performance 140-2. In some examples, package generation engine 124 may determine that one or more of monitoring parameters from the first monitoring parameters group availability 140-1 may be correlated to one or more of monitoring parameters from the third monitoring parameters group machine data 140-3. In some examples, package generation engine 124 may determine that one or more of monitoring parameters from the third monitoring parameters group machine data 140-3 may be correlated to one or more of monitoring parameters from the fifth monitoring parameters group network 140-5. In some examples, package generation engine 124 may determine that one or more of monitoring parameters from the fourth monitoring parameters group instances 140-4 may be correlated to one or more of monitoring parameters from the fifth monitoring parameters group network 140-5.

Once the monitoring parameters groups 140 and the correlations between the monitoring parameters groups 140 and different metrics 170 are determined, the package generation engine 124 generates monitoring packages 150 from the monitoring parameters 114 and 118 at least based on the identified correlations between monitoring parameters groups 140, layers 110, and metrics 170. For example, the package generation engine 124 generates the monitoring packages 150 by bundling or putting different sets of monitoring parameters from the monitoring parameters 114 and 118 and their heuristics 134 (in the determined time period by the user) that are correlated with different metrics 170 as determined by the monitoring parameters groups 140 in different data packages. Each monitoring packages 150 is a container used to describe and contain a different collection of monitoring parameters 114 and/or 118. Thus, based on different metrics 170, layers 110 in the computing platform 102, monitoring parameters 114 and 118, and the identified correlations between monitoring parameters groups 140, the package generation engine 124 may generate different monitoring packages 150 that could be used to monitor the computing platform 102 in terms of different metrics among metrics 170 in any given environmental condition compared to the heuristics 134 of the monitoring parameters 114 and 118. The generated monitoring packages 150 are stored in memory 130 and could be reused when the user selects this specific metric 170 again in the future.

Examples of Monitoring Packages

In some embodiments, the plurality of monitoring packages 150 comprises a first application specific monitoring package ("DA1" or "da1/dt") 152-1, a second application specific monitoring package ("DA2" or "da2/dt") 152-2, a first infrastructure specific monitoring package ("DI1" or "dI1/dt") 154-1, and a second infrastructure specific monitoring package ("DI2" or "dI2/dt") 154-2.

The first application specific monitoring package (DA1) 152-1 is a collection of a first plurality of application specific parameters ("a1") 114 measured over the time period set by the user saved in a container or a data package, wherein the first plurality of application specific parameters ("a1") is associated with a first metric 170-1. For example, consider that the first plurality of application specific parameters ("a1") consists of application monitoring parameters such as a first processor's speed, CPU utilization, number of cores, temperature, etc. When the first processor has a high temperature or a low speed, e.g., because of a newly caused physical defect, its performance reduces, hence, the performance metric 170-1 of the computing platform 102 decreases. Thus, these parameters are determined to be correlated with the performance metric of the computing platform 102. The first plurality of application specific parameters ("a1") with their heuristics 134 are saved in a data package class titled DA1 152-1 to be used to monitor the computing platform 102 in terms of the performance metric 170-1. For example, the first plurality of application specific parameters ("a1") that are related to the first processor, etc. may be saved in a class as below:

```
Class A1 {    //class for the first plurality of application
specific parameters ("a1")
    Class CPU { //nested class for the first processor
      public:
      int speed;
```

```
      int no_of_cores;
      int utilization;
      string type_of_processor;
      int temperature;
      string socket_type;
      int process_size;
      int cache_size;
      bool have_special_features; }
    ... }
```
Then, the A1 class may be called in the DA1 152-1 data package class as below:
```
    class DA1 {
      public:
      A1 a1; }
```

In some embodiments, the ("da1/dt") annotation indicates that derivative or rate of changes in the first plurality of application specific parameters ("a1") are calculated and included in the (DA1) 152-1. The first application specific monitoring package (DA1) 152-1 is created at least in part based on a first identified correlation between the application specific parameters 114 and the first metric 170-1 over the time period set by the user. In DA1 152-1 annotation, the "A" indicates that the first plurality of application specific parameters ("a1") are selected among application specific parameters 114 in this particular monitoring package, the "D" indicates that the heuristics 134 of the first plurality of application specific parameters ("a1") are included in this particular package, and the "1" indicates that this particular monitoring package is related to the first metric 170-1 of the computing platform 102. For example, the first plurality of application specific parameters ("a1") may be related to a first processor (e.g., central processing unit (CPU)), a first memory, page faults of the first memory, transaction failures, and error codes associated with the computing platform 102.

The second application specific monitoring package (DA2) 152-2 is a collection of a second plurality of application specific parameters ("a2") among application specific parameters 114 measured over the time period set by the user saved in a container or a data package, wherein the second plurality of application specific parameters ("a2") is associated with a second metric 170-2. For example, consider that the second plurality of application specific parameters ("a2") consists of application monitoring parameters such as a second processor speed, CPU utilization., number of cores, temperature, etc. When the second processor has a low speed, small number of cores, high temperature, etc., it is not available to perform its functions as scheduled, hence, the availability metric of the computing platform 102 decreases. Thus, these parameters are determined to be correlated with the availability metric of the computing platform 102. The second plurality of application specific parameters ("a2") with their heuristics 134 are saved in a data package class titled DA2 152-2 to be used to monitor the computing platform 102 in terms of the availability metric 170-2. In some embodiments, the ("da2/dt") annotation indicates that derivative or rate of changes in the second plurality of application specific parameters ("a2") are calculated and included in the (DA2) 152-2. The second application specific monitoring package (DA2) 152-2 is created at least in part based on a second identified correlation between the application specific parameters ("a2") and the second metric 170-2 over the time period determined by the user. The difference between the DA1 152-1 and DA2 152-2 is that they are comprised of different pluralities of application specific parameters (i.e., ("a1") and ("a2")) and they are related to different metrics (i.e., the first metric 170-1 and the second metric 170-2) of the computing platform 102.

The first infrastructure specific monitoring package (DI1) 154-1 is a collection a first plurality of infrastructure specific parameters ("i1") among infrastructure specific parameters 118 measured over the time period set by the user saved in a container or a data package, wherein the first plurality of infrastructure specific parameters ("i1") is associated with the first metric 170-1. In some examples, the second infrastructure specific parameters ("i2") may be related to dynamic-link library (DLL) files. For example, consider that the first plurality of infrastructure specific parameters ("i1") consists of infrastructure monitoring parameters such as errors from the DLL files, functions of the DLL files, etc. When the DLL files fail to perform their tasks, the performance metric 170-1 of the computing platform 102 decrease. Thus, these parameters are determined to be correlated with the performance metric 170-1 of the computing platform 102. The first plurality of infrastructure specific parameters ("i1") with their heuristics 134 are saved in a data package class titled DI2 154-1 to be used to monitor the computing platform 102 in terms of the performance metric 170-1.

For example, the first plurality of infrastructure specific parameters ("i1") that are related to the DLL files, etc. may be saved in a class as below:

```
Class I1 {      //class for the first plurality of infrastructure
specific parameters ("i1")
    Class DLLFiles { //nested class for the DLL files
        public:
        int error_rate;
        string type_of_error;
        int frequency_of_error
        int timestamp;
        string location_file; }
    ... }
```

Then, the I1 class may be called in the DI1 154-1 data package class as below:

```
class DI1 {
    public:
    I1 i1;// calling the I1 class
    }
```

In some embodiments, the ("di1/dt") annotation indicates that derivative or rate of changes in the first plurality of infrastructure specific parameters ("i1") are calculated and included in the (DI1) 154-1. The first infrastructure specific monitoring package (DI1) 154-1 is created at least in part based on a first identified correlation between the infrastructure specific parameters 118 and the first metric 170-1 over the time period determined by the user. In DI1 154-1 annotation, the "I" indicates that the first plurality of infrastructure specific parameters ("i1") are selected among infrastructure specific parameters 118 in this particular monitoring package, the "D" indicates that the heuristics 134 of the first plurality of infrastructure specific parameters ("i1") are included in this particular package, and the "1" indicates that this particular monitoring package is related to the first metric 170-1 of the computing platform 102.

The second infrastructure specific monitoring package (DI2) 154-2 is a collection a second plurality of infrastructure specific parameters ("i2") among infrastructure specific parameters 118 measured over the time period set by the user saved in a container or a data package, wherein the second plurality of infrastructure specific parameters ("i2") is associated with the second metric 170-2. In some examples, the second infrastructure specific parameters ("i2") may be related to a second processor (e.g., central processing unit (CPU)), a second memory, input/output (I/O), page files of the second memory, a second process, and windows management instrumentation (WMI) associated with the computing platform 102. For example, consider that the second plurality of infrastructure specific parameters ("i2") consists of infrastructure monitoring parameters such as errors from the WMI, functions of the WMI, etc. When the WMI fails to perform its tasks, the computing platform 102 is not able to perform its functions as scheduled, hence, the availability metric of the computing platform 102 decreases. Thus, these parameters are determined to be correlated with the availability metric of the computing platform 102. The plurality of infrastructure specific parameters ("i2") with their heuristics 134 are saved in a container titled DI2 154-2 to be used to monitor the computing platform 102 in terms of the availability metric 170-2. In some embodiments, the ("di2/dt") annotation indicates that derivative or rate of changes in the second plurality of infrastructure specific parameters ("i2") are calculated and included in the (DI2) 154-2. The second infrastructure specific monitoring package (DI2) 154-2 is created at least in part based on a second identified correlation between the infrastructure specific parameters 118 and the second metric 170-2 over the time period determined by the user. The difference between the DI1 154-1 and DI2 154-2 is that they are comprised of different pluralities of infrastructure specific parameters (i.e., ("i1") and ("i2")) and they are related to different metrics (i.e., the first metric 170-1 and the second metric 170-2) of the computing platform 102.

String of Packages Generation Engine

The string of packages generation engine 126 is configured to dynamically generate a unique string of monitoring packages 160 comprising a plurality of monitoring packages 150 for the specific metric 170, based at least in part upon the specific metric 170, the heuristics 134 of the monitoring parameters 114 and 118, the layers 110, and the current environmental condition of the computing platform 102. When the user selects the specific metric 170, the string of packages generation engine 126 proceeds to select a plurality of monitoring packages 150 to monitor the computing platform 102 in conjunction with the specific metric 170, that is suitable for the current environmental conditions of the computing platform 102.

Thus, when the user selects the specific metric 170, the string of packages generation engine 126 identifies the current environmental condition of the computing platform 102 by comparing the heuristics 134 of the monitoring parameters 114 and 118 and the heuristics baseliners 156 with respect to the specific metric 170. Then, the string of packages generation engine 126 dynamically generates a unique string of monitoring packages 160 for the specific metric 170 to monitor the computing platform 102 in terms of the specific metric 170 in the current environmental condition of the computing platform 102. Referring to FIG. 2, when the user selects the performance metric 170-1, the string of packages generation engine 126 outputs the string of monitoring packages 160-1 based on the performance metric 170-1, layers 110, monitoring packages 150, and the current environmental condition of the computing platform 102 in terms of the performance metric 170-1. In this example, the string of monitoring packages 160-1 comprises DA1 152-1, DI1 154-1, and DI2 154-2 monitoring packages. The string of packages generation engine 126 may select the plurality of monitoring packages 150 by calling their data package class. For example, the string of packages generation engine 126 may call the DA1 152-1, DI1 154-1, and DI2 154-2 data package classes to generate the first string of monitoring packages 160-1 as below:

```
class First_string {
    public:
    DA1 a1;    // calling the DA1 152-1 data package class
    DI1 i1;    // calling DI1 154-1 data package class
    DI2 i2;    // calling DI2 154-2 data package class
};
``` where the DA1 152-1, DI1 154-1, and DI2 154-2 are data packages.

Referring back to FIG. 1, the dynamically generated string of monitoring packages 160 for the specific metric 170 depends on the current environmental condition of the computing platform 102 and the heuristics 134 of the monitoring parameters 114 and 118. For example, if the heuristics 134 of the monitoring parameters 114 and 118 indicate an error-free, an error-prone, a stable, or a volatile computing platform 102, the string of packages generation engine 126 generates a differently unique string of monitoring package 160 for the performance metric 170-1 for each of these cases. For example, if the heuristics 134 of the monitoring parameters 114 and 118 indicate an error-free computing platform 102 compared to the heuristics 134 baseliners 156, the string of package generation engine 126 generates a first string of monitoring packages 160-1 for the specific metric 170 selected by the user, that provides meaningful insight regarding the specific metric 170 in the current error-free environmental condition of the computing platform 102. In another example, if the heuristics 134 of the monitoring parameters 114 and 118 indicate an error-prone computing platform 102 compared to the heuristics 134 baseliners 156, the string of package generation engine 126 generates a second string of monitoring packages 160-2 for the specific metric 170 selected by the user, that provides meaningful insight regarding the specific metric 170 in the current error-prone environmental condition of the computing platform 102. In another example, if the current heuristics 134 of the monitoring parameters 114 and 118 indicate a stable computing platform 102 compared to the heuristics baseliners 156, the string of package generation engine 126 generates a third string of monitoring packages for the specific metric 170 selected by the user, that provides meaningful insight regarding the specific metric 170 in the current stable environmental condition of the computing platform 102. In another example, if the current heuristics 134 of the monitoring parameters 114 and 118 indicate a volatile computing platform 102 compared to the heuristics baseliners 156, the string of package generation engine 126 generates a fourth string of monitoring packages for the specific metric 170 selected by the user, that provides meaningful insight regarding the specific metric 170 in the current volatile environmental condition of the computing platform 102.

Once the string of monitoring packages 160 is generated for the specific metric 170, the report generation engine 128 uses the generated string of monitoring packages 160 to monitor the computing platform 102 in terms of the specific metric 170. Throughout this process, the subset of the monitoring parameters from monitoring parameters 114 and 118 that were selected in monitoring packages 150 of the generated string of monitoring packages 160 and their heuristics 134 are analyzed to generate the report 182 related to the specific metric 170. The report generation engine 128 is further configured to predict possible failures of the computing platform 102 related to the specific metric 170 in the current environmental condition of the computing platform 102 based on the determined behavior of the particular metric 170 in the configurable time duration in the future.

Referring to the example of FIG. 2, the report generation engine 128 receives the generated string of monitoring packages 160-1 and generates the report 212 that includes the behavior of the performance metric 170-1 to be displayed on the user interface 180. In this example, the report generation engine 128 predicts possible failures of the computing platform 102 in terms of its performance metric 170-1 (e.g., CPU utilization) in the configurable time duration in the future set by the user. For example, if the report generation engine 128 determines that the CPU utilization of the computing platform 102 was 59% yesterday at 12 pm and is 50% today at 12 pm, based on the observed trend in the behavior of the CPU utilization and the current environmental condition of the computing platform 102, the report generation engine 128 may predict that the CPU utilization 170-1 maybe 41% tomorrow at 12 pm. In some examples, the report generation engine 128 may predict the CPU utilization within a boundary, such as the CPU utilization may be between 40% and 39% tomorrow at 12 pm. The user interface 180 then displays the determined behavior of the CPU utilization and its possible failures, for example in a plot format, a percentage format, and/or any other suitable formats. The user interface 180 also alerts the user regarding the behavior of the CPU utilization in the configurable time in the future, so that the user may prevent the possible failures of the computing platform 102 and increase the performance of the computing platform 102.

Figure 3:
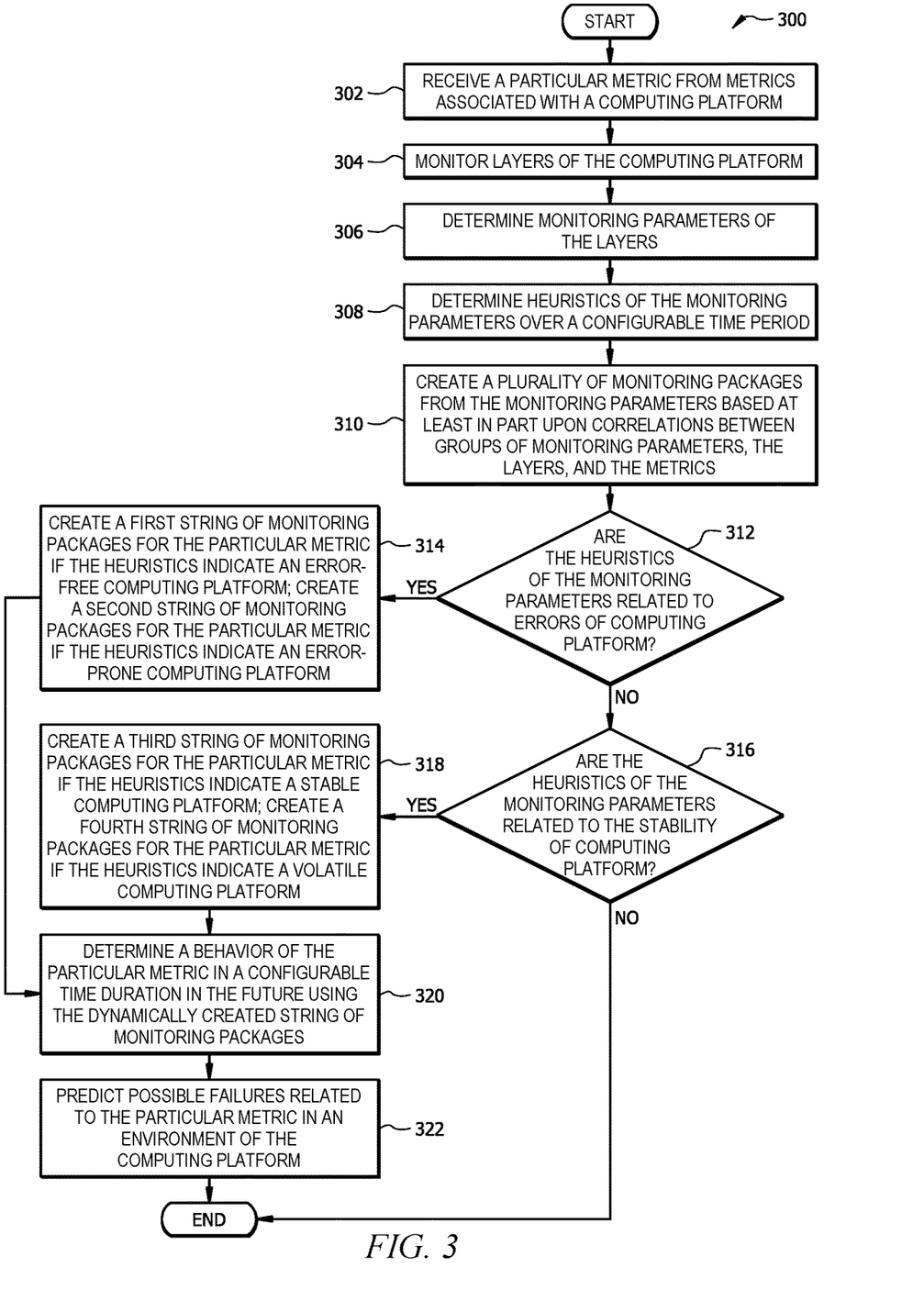
FIG. 3 illustrates an example flow chart of a method for monitoring a computing platform.

FIG. 3 illustrates an example flow chart of a method 300 for monitoring computing platform 102 in terms of a specific metric 170 associated with the computing platform 102. One or more of the steps 302-322 of the method 300 may be implemented, at least in part, in the form of executable code stored on non-transitory, tangible, machine-readable media that when executed may cause the one or more processors to perform one or more of the steps 302-322. In some embodiments, method 300 can be performed by one or more engines in system 100 of FIG. 1, including the monitoring engine 122, the package generation engine 124, the string of packages generation engine 126, and the report generation engine 128. Aspects of the steps 302-322 of method 300 have been covered in the description for FIGS. 1 and 2; and additional aspects are provided below.

The method 300 begins at a step 302 where the computing platform 102 receives specific metric 170 associated with the computing platform 102 from a user. For example, the user may select the specific metric in the user interface 180 from a drop-down menu. The computing platform 102 may be associated with a plurality of metrics 170 that are evaluating factors of the computing platform 102. The plurality of metrics 170 may comprise a performance, an availability, a recovery time, a resiliency, an error rate, an error type, a data traffic, a latency, etc.

At a step 304, the monitoring engine 122 monitors the layers 110 of the computing platform 102. For example, the monitoring engine 122 monitors the plurality of layers 110 by monitoring tools such as Splunk, Dynatrace, and/or the like. Typically, the monitoring engine 122 routinely monitors the plurality of layers 110 in order to have records of the status of the layers 110, regardless of whether the computing platform 102 receives specific metric 107 from the user. The layers 110 include application specific layers 112 and infrastructure specific layers 116. The application specific layers 112 are associated with application specific parameters 114. The infrastructure specific layers 116 are associated with infrastructure specific parameters 118.

At a step 306, the monitoring engine 122 determines the monitoring parameters 114 and 118. The package generation engine 124, then, identifies correlations between groups of monitoring parameters from monitoring parameters 114 and 118 and the metrics 170. Then, based on the identified correlations, the package generation engine 124 generates the monitoring parameters groups 140, where each of the monitoring parameters groups 140 is correlated to a metric from metrics 170. For example, the package generation engine 124 may identify that the first monitoring parameters group from the application specific parameters 114 (i.e., availability group 140-1) is related to the first metric 170-1. In another example, the package generation engine 124 may identify that the second monitoring parameters group from the infrastructure specific parameters 118 (i.e., application performance group 140-2) is related to the second metric 170-2.

At a step 308, the monitoring engine 122 determines the heuristics 134 of the monitoring parameters 114 and 118 over a time period that is configurable based on each monitoring parameter and the metrics 170. 5Here, the monitoring engine 122 accesses the recorded data of the monitoring parameters 114 and 118 and determines the historical behaviors of the monitoring parameters 114 and 118 in the time period set by the user. In some examples, the recorded data of the monitoring parameters are stored in the memory 130.

At a step 310, the package generation engine 124 creates the plurality of monitoring packages 150 (e.g., DA1 152-1, DA2 152-2, DI1 154-1, DI2 154-2, etc.) from the monitoring parameters 114 and 118 based at least on the identified correlations between the monitoring parameters groups 140, the layers 110, and the metrics 170. For example, package generation engine 124 creates the first application specific monitoring package (DA1) 152-1 from a first plurality of monitoring parameters ("da1") that are correlated to the first metric 170-1 and heuristics of the first plurality of monitoring parameters ("da1"). The heuristics 134 of the monitoring parameters 114 and 118 may indicate different behaviors of the computing platform 102 in different environmental conditions in terms of the specific metric 170. In the example of method 300, generating a different string of monitoring packages for monitoring the computing platform 102 in terms of the specific metric 170 in different environmental conditions (i.e., an error-free, an error-prone, a stable, a volatile) based on different indications of heuristics 134 of the monitoring parameters 114 and 118 are shown.

At a step 312, the string of packages generation engine 126 determines whether the heuristics 134 of the monitoring parameters 114 and 118 are related to errors of the computing platform 102. If, at step 312, the string of packages generation engine 126 determines that the heuristics 134 of the monitoring parameters 114 and 118 are related to errors of the computing platform 102, method 300 proceeds to a step 314. As discussed above, the heuristics 134 of the monitoring parameters 114 and 118 may indicate an error-free or an error prone computing platform 102 with respect to the specific metric 170.

At step 314, in a case where the heuristics 134 of the monitoring parameters 114 and 118 indicate an error-free computing platform 102 with respect to the specific metric 170, the string of packages generation engine 126 dynamically generates a first string of monitoring packages for the specific metric 170. In the other hand, if the heuristics 134 of the monitoring parameters 114 and 118 indicate an error-prone computing platform 102, the string of packages generation engine 126 dynamically generates a second string of monitoring packages for the specific metric 170.

At a step 316, the string of packages generation engine 126 determines whether the heuristics 134 of the monitoring parameters 114 and 118 are related to the stability of the computing platform 102. If, at step 316, the string of packages generation engine 126 determines that the heuristics 134 of the monitoring parameters 114 and 118 are related to the stability of the computing platform 102, method 300 proceeds to a step 318. As discussed above, the heuristics 134 of the monitoring parameters 114 and 118 may indicate a stable or a volatile computing platform 102 with respect to the specific metric 170.

At step 318, in a case where the heuristics 134 of the monitoring parameters 114 and 118 indicate a stable computing platform 102 for the specific metric 170, the string of packages generation engine 126 dynamically generates a third string of monitoring packages for the specific metric 170. In the other hand, if the heuristics 134 of the monitoring parameters 114 and 118 indicate a volatile computing platform 102 with respect to the specific metric 170, the string of packages generation engine 126 dynamically generates a fourth string of monitoring packages for the specific metric 107.

If, at step 316, the string of packages generation engine 126 determines that the heuristics 134 of the monitoring parameters 114 and 118 are not related to the stability of the computing platform 102, method 300 is terminated. In this case, results from observing the heuristics 134 of the monitoring parameters 114 and 118 may be inconclusive, thus, terminating method 300, e.g., by displaying an error message on the user interface 180.

In every mentioned environmental condition in steps 314 and 318, after the string of packages generation engine 126 dynamically creates any of the first to the fourth string of monitoring packages 160, method 300 proceeds to a step 320.

At step 320, the report generation engine 128 monitors the computing platform 102 in terms of the specific metric 107 using the dynamically created string of monitoring packages 160. The report generation engine 128 determines the behavior of the specific metric 170 in the configurable time duration in the future using the dynamically created string of monitoring packages in either of steps 314 and 318.

At a step 322, the report generation engine 128 predicts possible failures of the computing platform 102 related to the specific metric 170 in the current environmental condition of the computing platform 102 based on the determined behavior of the particular metric 170 in the configurable time duration in the future. The report generation engine 128 also generates the report 182 that includes the determined behavior of the specific metric 170 and possible failures of the computing platform 102. The report generation engine 128 then displays the report 182, for example in a time-domain plot, in a percentage format, and/or any other suitable formats.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U. S.C. § 112(f) as it exists on the date of filing hereof unless the words "means for" or "step for" are explicitly used in the particular claim.

The invention claimed is:

1. A system for monitoring a computing platform, comprising:
   a processor configured to:
   receive a particular metric from a plurality of metrics associated with the computing platform, wherein the plurality of metrics comprises a first metric associated with a performance of the computing platform and a second metric associated with an availability of the computing platform;
   monitor a plurality of layers of the computing platform, wherein the plurality of layers comprises a plurality of application specific layers and a plurality of infrastructure specific layers;
   determine monitoring parameters of the plurality of layers, wherein the monitoring parameters comprise a plurality of application specific parameters associated with the application specific layers and a plurality of infrastructure specific parameters associated with the infrastructure specific layers;
   determine heuristics of each monitoring parameter over a time period that is configurable based on each monitoring parameter and the plurality of metrics;
   create a plurality of monitoring packages from the monitoring parameters based at least in part upon correlations between groups of monitoring parameters, the plurality of layers, and the plurality of metrics, wherein the plurality of monitoring packages comprises:
      a first application specific monitoring package comprising a first plurality of application specific parameters measured over the time period, wherein the first plurality of application specific parameters is associated with the first metric;
      a second application specific monitoring package comprising a second plurality of application specific parameters measured over the time period, wherein the second plurality of application specific parameters is associated with the second metric;
      a first infrastructure specific monitoring package comprising a first plurality of infrastructure specific parameters measured over the time period, wherein the first plurality of infrastructure specific parameters is associated with the first metric;
      a second infrastructure specific monitoring package comprising a second plurality of infrastructure specific parameters measured over the time period, wherein the second plurality of infrastructure specific parameters is associated with the second metric;
   based at least in part upon the particular metric that is received, dynamically create a string of monitoring packages from the plurality of monitoring packages, wherein the string of monitoring packages comprises at least one application specific monitoring package and at least one infrastructure specific monitoring package; and
   a memory operably coupled to the processor, the memory configured to store the monitoring parameters, the heuristics of each monitoring parameter over the time period, the plurality of monitoring packages, and the string of monitoring packages;
   wherein:
      the heuristics of each monitoring parameter is a time series that provides information about errors of the computing platform in a configurable time period; and
      the string of monitoring packages dynamically created by the processor comprises a first string of monitoring packages when the heuristics of the monitoring parameters indicate an error-free computing platform for the particular metric, and a second string of monitoring packages different from the first string of monitoring packages when the heuristics of the monitoring parameters indicate an error-prone computing platform for the particular metric.

2. The system of claim 1, wherein the processor is further configured to correlate the monitoring parameters and the plurality of metrics such that a first group of monitoring parameters that are related to the first metric are correlated together and a second group of monitoring parameters that are related to the second metric are correlated together.

3. The system of claim 1, wherein the processor is further configured to:
   determine a behavior of the particular metric in a configurable time duration in the future using the dynamically created string of monitoring packages; and
   predict possible failures of the computing platform related to the particular metric in an environment of the computing platform based on the determined behavior of the particular metric in the configurable time duration in the future.

4. The system of claim 1, wherein:
   the heuristics of each monitoring parameter is a time series that provides information about a stability of the computing platform in a configurable time period; and
   the string of monitoring packages dynamically created by the processor comprises a third string of monitoring packages when the heuristics of the monitoring parameters indicate a stable computing platform for the particular metric, and a fourth string of monitoring packages different from the third string of monitoring packages when the heuristics of the monitoring parameters indicate an unstable computing platform for the particular metric.

5. The system of claim 1, wherein the processor is configured to receive the particular metric from a drop-down menu in a user interface display, and the plurality of metrics comprises a performance, an availability, a recovery time, a resiliency, an error rate, an error type, a data traffic, and a latency.

6. The system of claim 1, wherein:
the first application specific monitoring package is created further based on a first identified correlation between the application specific parameters and the first metric over the time period; and
the second application specific monitoring package is created further based on a second identified correlation between the application specific parameters and the second metric over the time period.

7. The system of claim 1, wherein:
the first infrastructure specific monitoring package is created further based on a first identified correlation between the infrastructure specific parameters and the first metric over the time period; and
the second infrastructure specific monitoring package is created further based on a second identified correlation between the infrastructure specific parameters and the second metric the time period.

8. The system of claim 1, wherein when the processor receives the first metric, the dynamically created string of monitoring packages for the first metric comprises the first application specific monitoring package, the first infrastructure specific monitoring package, and the second infrastructure specific monitoring package.

9. A method for monitoring a computing platform, comprising:
receiving a particular metric from a plurality of metrics associated with the computing platform, wherein the plurality of metrics comprises a first metric associated with a performance of the computing platform and a second metric associated with an availability of the computing platform;
monitoring a plurality of layers of the computing platform, wherein the plurality of layers comprises a plurality of application specific layers and a plurality of infrastructure specific layers;
determining monitoring parameters of the plurality of layers, wherein the monitoring parameters comprise a plurality of application specific parameters associated with the application specific layers and a plurality of infrastructure specific parameters associated with the infrastructure specific layers;
determining heuristics of each monitoring parameter over a time period that is configurable based on each monitoring parameter and the plurality of metrics;
creating a plurality of monitoring packages from the monitoring parameters based at least in part upon correlations between groups of monitoring parameters, the plurality of layers, and the plurality of metrics, wherein the plurality of monitoring packages comprises:
a first application specific monitoring package comprising a first plurality of application specific parameters measured over the time period, wherein the first plurality of application specific parameters is associated with the first metric;
a second application specific monitoring package comprising a second plurality of application specific parameters measured over the time period, wherein the second plurality of application specific parameters is associated with the second metric;
a first infrastructure specific monitoring package comprising a first plurality of infrastructure specific parameters measured over the time period, wherein the first plurality of infrastructure specific parameters is associated with the first metric;
a second infrastructure specific monitoring package comprising a second plurality of infrastructure specific parameters measured over the time period, wherein the second plurality of infrastructure specific parameters is associated with the second metric;
based at least in part upon the particular metric that is received, dynamically creating a string of monitoring packages from the plurality of monitoring packages, wherein the string of monitoring packages comprises at least one application specific monitoring package and at least one infrastructure specific monitoring package;
wherein:
the heuristics of each monitoring parameter is a time series that provides information about errors of the computing platform in a configurable time period; and
the string of monitoring packages comprises a first string of monitoring packages when the heuristics of the monitoring parameters indicate an error-free computing platform for the particular metric, and a second string of monitoring packages different from the first string of monitoring packages when the heuristics of the monitoring parameters indicate an error-prone computing platform for the particular metric.

10. The method of claim 9, further comprising:
correlating the monitoring parameters and the plurality of metrics such that a first group of monitoring parameters that are related to the first metric are correlated together and a second group of monitoring parameters that are related to the second metric are correlated together.

11. The method of claim 9, further comprising:
determining a behavior of the particular metric in a configurable time duration in the future using the dynamically created string of monitoring packages; and
predicting possible failures of the computing platform related to the particular metric in an environment of the computing platform based on the determined behavior of the particular metric in the configurable time duration in the future.

12. The method of claim 9, wherein:
the heuristics of each monitoring parameter is a time series that provides information about a stability of the computing platform in a configurable time period; and
the string of monitoring packages dynamically comprises a third string of monitoring packages when the heuristics of the monitoring parameters indicate a stable computing platform for the particular metric, and a fourth string of monitoring packages different from the third string of monitoring packages when the heuristics of the monitoring parameters indicate an unstable computing platform for the particular metric.

13. The method of claim 9, wherein the receiving the particular metric comprises:
receiving the particular metric from a drop-down menu in a user interface display, and the plurality of metrics comprises a performance, an availability, a recovery time, a resiliency, an error rate, an error type, a data traffic, and a latency.

14. The method of claim 9, wherein:
the first application specific monitoring package is created further based on a first identified correlation between the application specific parameters and the first metric over the time period; and
the second application specific monitoring package is created further based on a second identified correlation between the application specific parameters and the second metric over the time period.

15. The method of claim 9, wherein:
the first infrastructure specific monitoring package is created further based on a first identified correlation between the infrastructure specific parameters and the first metric over the time period; and
the second infrastructure specific monitoring package is created further based on a second identified correlation between the infrastructure specific parameters and the second metric the time period.

16. The method of claim 9, wherein:
wherein when the first metric is received, the dynamically created string of monitoring packages for the first metric comprises the first application specific monitoring package, the first infrastructure specific monitoring package, and the second infrastructure specific monitoring package.

17. A computer program comprising executable instructions stored in a non-transitory computer-readable medium that when executed by a processor causes the processor to:
receive a particular metric from a plurality of metrics associated with a computing platform, wherein the plurality of metrics comprises a first metric associated with a performance of the computing platform and a second metric associated with an availability of the computing platform;
monitor a plurality of layers of the computing platform, wherein the plurality of layers comprises a plurality of application specific layers and a plurality of infrastructure specific layers;
determine monitoring parameters of the plurality of layers, wherein the monitoring parameters comprise a plurality of application specific parameters associated with the application specific layers and a plurality of infrastructure specific parameters associated with the infrastructure specific layers;
determine heuristics of each monitoring parameter over a time period that is configurable based on each monitoring parameter and the plurality of metrics;
create a plurality of monitoring packages from the monitoring parameters based at least in part upon correlations between groups of monitoring parameters, the plurality of layers, and the plurality of metrics, wherein the plurality of monitoring packages comprises:
a first application specific monitoring package comprising a first plurality of application specific parameters measured over the time period, wherein the first plurality of application specific parameters is associated with the first metric;
a second application specific monitoring package comprising a second plurality of application specific parameters measured over the time period, wherein the second plurality of application specific parameters is associated with the second metric;
a first infrastructure specific monitoring package comprising a first plurality of infrastructure specific parameters measured over the time period, wherein the first plurality of infrastructure specific parameters is associated with the first metric;
a second infrastructure specific monitoring package comprising a second plurality of infrastructure specific parameters measured over the time period, wherein the second plurality of infrastructure specific parameters is associated with the second metric;
based at least in part upon the particular metric that is received, dynamically create a string of monitoring packages from the plurality of monitoring packages, wherein the string of monitoring packages comprises at least one application specific monitoring package and at least one infrastructure specific monitoring package; and
a memory operably coupled to the processor, the memory configured to store the monitoring parameters, the heuristics of each monitoring parameter over the time period, the plurality of monitoring packages, and the string of monitoring packages;
wherein:
the heuristics of each monitoring parameter is a time series that provides information about errors of the computing platform in a configurable time period; and
the string of monitoring packages comprises a first string of monitoring packages when the heuristics of the monitoring parameters indicate an error-free computing platform for the particular metric, and a second string of monitoring packages different from the first string of monitoring packages when the heuristics of the monitoring parameters indicate an error-prone computing platform for the particular metric.

18. The computer program of claim 17, wherein the computer program further causes the processor to:
determine a behavior of the particular metric in a configurable time duration in the future using the dynamically created string of monitoring packages; and
predict possible failures of the computing platform related to the particular metric in an environment of the computing platform based on the determined behavior of the particular metric in the configurable time duration in the future.

* * * * *